June 11, 1968 G. H. GARRAWAY 3,387,457
COMBINED TURBOJET AND TURBOPROP ENGINE
Filed March 1, 1965

INVENTOR.
GEORGE H. GARRAWAY
BY
Davis, Hoxie, Faithfull & Hapgood
ATTORNEYS.

United States Patent Office 3,387,457
Patented June 11, 1968

3,387,457
COMBINED TURBOJET AND TURBOPROP ENGINE
George H. Garraway, 20 Thorman Lane,
Huntington, N.Y. 11743
Filed Mar. 1, 1965, Ser. No. 436,211
The portion of the term of the patent subsequent
to July 12, 1983, has been disclaimed
11 Claims. (Cl. 60—224)

ABSTRACT OF THE DISCLOSURE

A turbo engine combining plural propulsive units supplied with pressurized air from a common turbine powered compressor such that a constant portion of the compressed air is utilized by the compressor-driving turbine and the balance of the compressed air is selectively divided between the plural propulsive units. The exhaust stream from the compressor driving turbine is used for heat exchange with one of the propulsive units. Combustion air may also be used for heat exchange. Additional heat energy may be added to this turbine exhaust stream to derive additional thrust.

---

Figure 2:
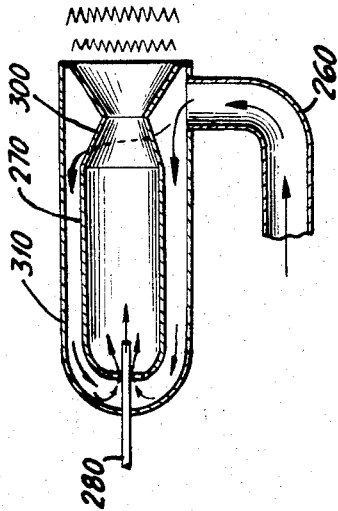

This invention relates to a gas-turbine engine and more particularly to a combination turbojet and turbopropeller engine or turbojet and turbo-lift-fan engine.

In prior straight jet propulsion aircraft there is a need to generate larger thrusts at take-off and climb, in order to use short runways, to attain faster and steeper climb to altitude, and for vertical take-offs than is available with such aircraft. The turbojet engine commonly used for high speed aircraft produces relatively inadequate thrusts to satisfy the optimum or highly desirable thrusts for take-off at sea level static conditions, whereas the thrusts the same engine develops at high speed and altitude is adequate. Gas-turbine engine driven propellers have been used in various aircraft to provide much of the advantages of engines. Although such engines, commonly termed turboprop engines, are superior under take-off conditions to the turbojet they are inferior to the turbojet for such use at high altitude and high speed flight.

Various attempts have been made to provide in one engine the composite advantages of the turbo-propeller for take-off and climb, and of the turbojet for high altitude high speed flight. None of the known attempts have been entirely satisfactory.

An object of this invention is to provide a practical combined turbojet and turboprop or turbo-lift-fan engine.

Another object of the invention is to provide an engine that develops large thrusts for short field take-offs and climb and even vertical take-offs from a standstill position and that is, furthermore, capable of improved performance at supersonic speeds and high altitude.

My invention is based on the principle of diverting a substantial portion of compressor discharge air from passage through the turbine driving the compressor and passing the diverted flow, for take-off and low speeds, to a low speed thrust producer such as a turbo-lift-fan or turbo-propeller unit; for high speeds, to a high speed thrust producer such as a pure-jet unit; and for transition speeds, to both units proportional to the requirements of each. By the term "pure-jet" I mean a jet-producing unit comprising a combustion chamber and exhaust nozzle for converting the hot gases evolved therefrom without passing them through a turbine.

According to my invention, I provide an engine having a compressor arranged to supply a portion of its output of compressed air to a turbine unit for driving the compressor, and the remaining portion of its output to a pure jet unit, a turbo-propeller unit, or both. The turbo-propeller unit serves as a high thrust producer for short take-offs of conventional, horizontal take-off, aircraft or as a lift thrust unit for vertical take-off aircraft. The pure jet unit serves to provide improved performance as a thrust producer for high altitude for both subsonic and supersonic speeds. Additional pure jet units of small thrust capacity may be used in conjunction with the turbo-propeller unit advantageously located for attitude control when the aircraft is hovering in the vertical lift mode, with the main energy being used by the turbo-lift-fan unit.

The advantages of the engine of my invention are significant. The main turbine may be designed for a substantially constant proportion of compressor air flow for all modes of operation, i.e., from take-off at sea level from a standstill to maximum high speed flight at high altitude (Mach 2 to Mach 5 at altitudes exceeding 70,000 feet), since the compressed air portion which is diverted around it is utilized fully and continuously to develop thrust throughout the entire range of operation. At take-off and low speeds, high volume of air with relatively low velocity provides large thrusts which is produced by the turbo-propeller unit, and at high speeds and altitude, the pure jet unit at compressor discharge pressure provides the required high velocity jet. The exhaust gases from the compressor-driving turbine may be used to provide some additional jet thrust under all conditions.

Adavntageously, the ducts carrying the compressed air to the turbo-propeller unit can be of minimal size and of conventional materials since the air is at compressor discharge pressure and temperature, usually, for example, at 50 to 150 p.s.i. and 350° to 500° F., dependent upon the pressure ratio of the compressor and ambient condition of air at the compressor inlet.

The engine of my invention is arranged so that the flow of the portion of the compressor air which bypasses the main turbine is variably controlled to the turbo-propeller unit or to the pure jet unit, or to both during transition periods. During take-off the engine is thus arranged through suitable valving so that the largest part of the thrust is produced by the turbo-propeller unit, and as speed and altitude is increased the valve control reduces the propeller thrust and increases the thrust of the pure jet unit, until at supersonic speeds the propeller unit may be made inactive and the pure jet unit operated in full thrust operation, supplemented by the jet thrust available from the main turbine exhaust, if desired.

It is to be noted that the energy of the pure jet may reflect operating the combustion zone at compressor discharge pressure and substantially stoichiometric burning levels and not as is usual with conventional turbojet engines where passage of combustion gases through the turbine and the metallurgical tolerance of the relatively uncooled afterburner, limit the temperature and pressure within the combustion zone. I provide for cooling high temperatures of my pure jet by cooling the high pressure combustor and nozzle of the pure jet unit with the mass flow of the main turbine exhaust fluid over and about their external surfaces. A suitable form of apparatus for mass cooling of the high temperature units is disclosed in my copending application Ser. No. 206,735, filed July 2, 1962 entitled "Turbo-Compressor Drive for Jet Power Plant." I provide for an alternative form of mass cooling by having the compressor discharge air passed over the hot surfaces of the combustor and nozzle prior to combustion.

Advantageously, a compressor designed for very high compression ratios is not needed for an engine according to my invention. With past turbojet engines, it is known that for high supersonic speeds a low compression ratio, such as 4:1 is adequate, but due to the take-off requirements, compressors must provide ratios as high as 9:1 and even 14:1. The portion of the compressor air which is bypassed to drive the turbo-propeller at take-off for large thrust makes unnecessary such high ratios, and allows for the use of a compressor with ratios of 4:1 or 6:1. Further, since the air flow bypassed around the main compressor-driving turbine is used fully and continuously for either the turbo-propeller unit or the pure jet unit, or both, the system may be designed for substantially balanced and predictable airflow characteristics.

Figure 1:
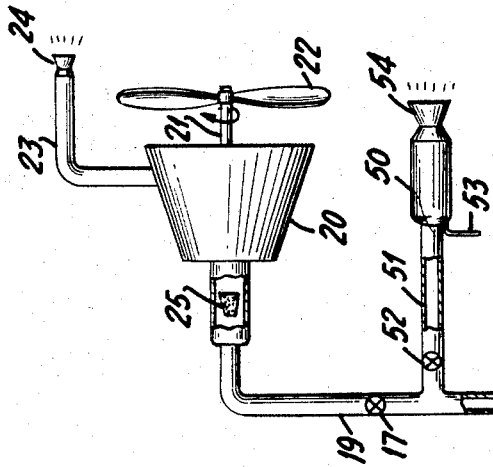

In the drawing:

FIG. 1 illustrates in schematic form, partly in section, one embodiment of my invention; and FIG. 2 illustrates in schematic form, partly in section, a modification of the main combustor of the embodiment of FIG. 1.

In the following detailed description, reference is made to FIGURE 1.

A suitable compressor of the gas turbine engine is illustrated for convenience as an axial flow compressor 10 preceded by a conventional ram-diffuser 11. The compressor has a ratio of 4:1 compression. However, higher compression may be used if desired. Air enters the engine through the diffuser as indicated by the arrows at 11a. The compressor is driven by turbine 12 by a common shaft 13 therebetween. A portion of the discharge air from compressor 10 is carried through duct 14, in which are combustors or burners 15 to which fuel is metered by suitable control means well known in the art. The specific construction of either the burner or fuel control means form no part of the present invention. Another flow path of air discharged from compressor 10 is provided by duct 16 to two air flow systems. Duct 16 may be an annulus with appropriate openings to connect to cross-sectional circular or oblong ducts 19, 26 or 26a. Valves 17, 18, 18a are provided in these ducts to provide variable air flow restrictions therein. These valves may be regulated manually or automatically by any of the usual and well-known valve control means responsive to the speed of the aircraft, for example, or any other parameter indicative of aircraft speed to control the flow of compressor discharge air through either or both valves to the air ducts downstream thereof. Duct 19 carries compressor discharge air to a turbine 20 after being heated just before entry to the turbine by a combustor 25. Turbine 20 drives a shaft 21 for rotating a lift-fan 22. Lift-fan 22 may be located in the wing or in another portion of the aircraft and oriented such that it develops a thrust to produce the desired movement of the aircraft. The exhaust of spent gases from turbine 20 is carried by duct 23 to a suitable nozzle 24 for developing a jet thrust advantageously aiding the thrust of the lift-fan 22.

Additional lift-fans may be provided so that, for example, one lift-fan is located in each of the wings of the aircraft. For such a design, duct 19a, shown in dotted lines, a duplicate of duct 19, carries compressed air from compresor 10 through the same or additional valve 17 to a second turboprop unit.

As valves 18 and 18a are opened, compressed air from compressor 10 flows through duct 16, valve 18 and 18a and ducts 26 and 26a all to the single combustor 27. Fuel for combustion with the compressed air is metered through conduit 28 and injected into the combustor through fuel nozzles 29. Combustion gases produced in combustor 27 expand through a suitable jet nozzle 30, such as a De Laval nozzle, to produce a high-velocity, low-pressure jet stream 41.

The turbine exhaust duct 34 of the engine carries exhaust gases flowing from turbine 12 to main nozzle 31 whereby a jet 40 of the expanding gases is developed. If desired, an after-burner may be included to enhance further the energy level of the jet gases. For that purpose I have shown an after-burner fuel nozzle 32 by which metered fuel is injected into the annular passageway surrounding the main burner 27 and burns with the unburned oxygen from turbine 12 to produce still greater thrust when needed.

The gases exhausting from turbine 12 have lost considerable heat energy in the passage through the turbine and lose still more before reaching the portion of the air passage system around the high pressure burner 27. These gases thus are cool relative to the temperature of the burner surface and thus function as a coolant of that surface. The temperature gradient longitudinally of the burner is such that in view of the cooling turbine gases, the position of the after-burner nozzles 32, relative to the length of the burner 27, may be selected to effect optimum effective after-burning at a position where the temperature of the gas-flow is the least.

In operation, whether for vertical take-offs or short-distance take-offs, valve 17 is fully opened and valve 18 is closed so that compressor air can flow only through ducts 16 and 19 to turbine 20 and duct 14 to turbine 12. Compressor 10 is started in the usual manner and combustors 15 are ignited, driving turbine 12 by the heated gases therefrom. Compressor 10 forces the air at relatively low temperature, not greater than 400 to 500° F. through ducts 16 and 19 and turbine 20 after being heated by burner 25. The lift-fan 22 is then rotated by turbine 20 developing a large thrust. In addition, the exhaust from turbine 20 develops a jet through nozzle 24 in the same direction of the lift-fan thrust thereby aiding the lift-fan.

It will be obvious to those skilled in this art that when an engine of my invention is adapted to drive a propeller for horizontal thrusts rather than a lift-fan, lift-fan 22 is replaced by a propeller of suitable design, many of which are well known. Such a system then would be what is usually termed in a turboprop-turbojet engine. Accordingly, when the aircraft equipped with a turboprop-turbojet engine is desired to be used for take-off from a short runway, valve 17 together with the fuel and ignition system are regulated to effect operation of propeller 22 and valve 18 is regulated to supply air to high-pressure combustor 27 to develop a jet of desired thrust therefrom. Thus the jet produced through nozzle 41 is controllable by adjustment of valve 18 as well as the usual control by metering the fuel through nozzle 29. After take-off and when speeds greater than subsonic ranges are desired, valve 17 is closed fully rendering the turbine 20 inoperative, valve 18 is regulated to control the flow of air to high-pressure combustor 27.

According to my invention, when the system is operating with the pure-jet engine portion, there is no need to use excess combustion air to reduce the temperature of the combustion products within high-pressure combustor 27 by the usual cooling procedures and the ratio of fuel-to-air can be made substantially stoichiometric within the high-pressure combustor 27. This is possible since the external walls of the burner 27 and nozzle 30 are subjected to the relatively cooler gases from the turbine exhaust. Accordingly, the combustor even of conventional material design can withstand combustion products of higher temperature than heretofore considered possible. The combustion products passing to and through jet nozzle 30 come in contact only with static surfaces which are cooled as described in my copending application Ser. No. 206,735, referred to above, and my application Ser. No. 768,497, filed Oct. 20, 1958, entitled "Turbo-Compressor Drive for Jet Power Plant."

I provide means for controlling the attitude or orientation of the aircraft during lift-fan take-off operation by appropriately locating pure jet units of relatively small thrust capacity but sufficient to develop thrust for orientation purposes. Such a unit 50 is supplied air from the compressor 10 through a supply duct 51 connected to a duct such as 19 through a valve 52 therein and fuel through fuel inlet 53. The valve 52, fuel inlet 53, as well as usual ignition means are subject to the control of the pilot during the vertical lift mode. One or more such jet units 50 are located about the aircraft to effect the desired attitude control.

If it is required that the pure jet unit (main combustor 27 and the nozzle 30) be located remote from the main housing, more particularly, remote from the turbine exhaust, I provide means for allowing for such a requirement without loss of the advantage of stoichiometric combustion. Referring to FIGURE 2, there is illustrated a combustor 270, an exhaust nozzle 300, fuel inlet conduit 280, and compressor discharge air duct 260. Duct 260 carries compressor air into an annular chamber 310 surrounding the burner 270 in the downstream portion thereof. The air flow follows the arrows shown in heat exchange relation with the surface of the combustion chamber 270 thereby mass cooling the surface of the combustor and increasing the heat content of the compressor discharge air. One or more of the pure-jet units illustrated in FIG. 2 may be located on the wings or fuselage of the aircraft and be operated from the system by connection to the main compressor 10 from ducts such as 26 or 26a connecting to duct 260. The valve control for the air flow and the fuel control are as described for the embodiment of FIG. 1. Except as noted the mode of operation is the same as that for FIG. 1.

During the transition period from turbo-propeller operation to turbojet operation, I provide manual or automatic means (not shown) for regulating the adjustment of bypass air valves 17 and 18 as well as fuel metering means for burners 25 and 27. The turbo-propeller portion and turbojet portion thus may be controlled to develop jointly or separately a thrust as a function of the adjustment of such means responsive to the will of the pilot, the speed of the engine, the speed or altitude of the aircraft, or any other appropriate parameter indicative of the flight condition of the aircraft as desired.

It is to be noted that a greater energy drop through jet nozzle 30 is possible effecting a greater propulsive thrust at high-speed since the gases of combustion in burner 27 do not pass through and are not reduced in pressure by a high-temperature-intolerant turbine. In addition, a much greater contribution to thrust is available at take-off because the auxiliary turbine driving the propeller or lift-fan 22 is serving only as a rotational motor force of that fan or propeller and is not being used to drive a compressor. The compressor usually needed for compressing air for the turbine is driven, according to my invention by another turbine 12, independent of a propeller-driving turbine 20. Also, the ducts 19 and 19a need not be made of special heat-resistant or heat-tolerant materials since the air carried therein is at a relatively low temperature and pressure.

In the claims, the terms turboprop and turbo-lift-fan will be understood to be equivalent means of developing a low-speed thrust as discussed above.

I claim:
1. A combination turbojet-turboprop power plant for use on aircraft comprising:
   (a) an elongated tubular casing opening at opposite ends and defining the outer periphery of a main air passageway,
   (b) one of said ends being disposed to receive inlet air,
   (c) the other of said ends comprising an exhaust nozzle for ejecting hot exhaust from said passageway to the atmosphere in a propulsive jet,
   (d) an air compressor disposed within said tubular casing and communicating at its inlet with said inlet end and at its outlet with said passageway downstream of said inlet end,
   (e) a fluid turbine drivingly connected to said compressor,
   (f) a fluid heat generator located in an air passage between said compressor and said turbine,
   (g) a second heat generator disposed within said casing downstream of said fluid turbine such that the gases discharging from said turbine are in direct heat exchange relation with the external surface of the second heat generator,
   (h) an air passage for delivering air compressed by the compressor directly to said second heat generator for substantially stoichiometric combustion,
   (i) an exhaust nozzle associated with said second heat generator for ejecting exhaust gases from said second heat generator to the atmosphere in a propulsive jet,
   (j) a turboprop unit,
   (k) an air passage between said turboprop unit and the outlet of said compressor,
   (l) a third heat generator in said air passage for increasing the temperature of air in said passage,
   (m) a propeller driven by said turboprop unit, and
   (n) valve means for selectively regulating the flow of air in said air passages from said compressor to said second and third heat generators.

2. A combined turbo-jet-turboprop power plant comprising:
   (a) a compressor,
   (b) combustion equipment arranged to receive air compressed by the compressor to be heated therein by combustion with fuel,
   (c) a turbine connected to said combustion equipment to receive gaseous products of the combustion to be expanded therein to drive the turbine,
   (d) an exhaust duct on the downstream side of the turbine to receive gases from the turbine, said exhaust duct comprising a nozzle for developing a propulsion jet,
   (e) a divided air-passageway from said compressor including valve means for selectively dividing the flow of air between two alternate paths,
   (f) a high pressure combustor located within said exhaust duct with its exterior surface in heat exchange relationship with the gases exhausting from the turbine to allow for substantially stoichiometric combustion in said high pressure combustor,
   (g) a second turbine including combustion means for heating air connected to the other of said paths, and
   (h) propeller means driven by said second turbine.

3. The method of operating a gas turbine engine having
   a compressor,
   a turbine for driving the compressor,
   a first air passage leading from the compressor to the turbine,
   a burner for heating air in said first passage,
   a main burner chamber with an exhaust propulsive jet nozzle,
   a second air passage leading from said compressor to said main burner,
   a secondary turbine for driving propeller means, and
   a third air passage leading from said compressor to said secondary turbine, including the steps of operating the compressor driving turbine, regulating the flow of air in said second and third passages so as to apportion that flow between the second and third passages, cooling the main burner chamber and its exhaust nozzle by passing a portion of the total of the air flowing through the engine over and about the exterior surface of said main burner chamber and nozzle, and effecting substantially stoichiometric combustion in said main burner.

4. A combination turbojet-turboprop power plant comprising a compressor, a turbine for driving said compressor, means for heating air from said compressor and delivering it to said turbine, a burner chamber for producing substantially high-temperature high-pressure air, a nozzle connected to said burner for receiving hot air from said burner and ejecting the hot air into the atmosphere in a propulsive jet, duct means for delivering compressed air from said compressor to said burner, said duct means including means to pass said air over and about the burner chamber prior to delivering the air to the burner for stoichiometric combustion therein so as to cool the burner chamber, a second turbine, a conduit structure for delivering air to said second turbine from said compressor, a second burner in said structure for heating the air, said second burner being located relatively nearer said second turbine than said compressor, and valve means in said structure for regulating the flow of air from said compressor.

5. A power plant according to claim 1 further comprising an after-burner disposed in the portion of the main air passageway near the downstream end of said second heat generator.

6. A gas turbine engine comprising a compressor, a main turbine for driving said compressor, a main duct for carrying a portion of air from said compressor to the turbine, including combustor means in said main duct for heating the turbine inlet air, an exhaust duct for said turbine, a bypass duct for carrying the remaining portion of air from said compressor to an air valve, a turbo-prop unit, a main combustor chamber having an exterior surface in communication with a portion of the gas flowing through the engine to effect heat exchange from the chamber to said gas flow such that combustion within the main combustor is substantially stoichiometric, an exhaust nozzle from said main combustor, duct means connecting said air valve respectively to said main combustor and said turboprop unit, and means for adjusting said valve to selectively control the flow of air from said compressor through said air valve to said turboprop unit and said main combustor.

7. An engine according to claim 6 wherein said main combustor and exhaust nozzle is located in the exhaust duct for the main turbine exhaust, to effect heat exchange from the surface of the combustor and nozzle to said turbine exhaust.

8. An engine according to claim 6 wherein said main combustor and nozzle is cooled by heat exchange with the air from said compressor prior to combustion.

9. An engine according to claim 6 further having a relatively small thrust pure jet unit for orienting an aircraft propelled by said engine, a duct from said orienting unit connected to said bypass duct supplying air to said turboprop, and valve means for regulating the flow of air to said orienting unit.

10. The method of claim 3 wherein said main burner and nozzle is in heat exchange relation with the main turbine exhaust and the additional step of cooling the main burner and nozzle with turbine exhaust gases passing over and about said main burner and nozzle.

11. The method of claim 3 comprising the step of cooling said main burner and nozzle with the flow of air from said second air passage from said compressor by passing said air over and about the burner and nozzle prior to combustion.

References Cited

UNITED STATES PATENTS

| | | | |
|---|---|---|---|
| 2,589,732 | 3/1952 | Riviere | 60—224 |
| 2,672,726 | 3/1954 | Wolf | 60—225 |
| 2,899,149 | 8/1959 | Breguet | 244—12 |
| 3,139,244 | 6/1964 | Bright | 244—12 |
| 3,173,628 | 3/1965 | Marchant | 244—12 |
| 3,260,044 | 7/1966 | Garraway | 60—224 |
| 3,263,416 | 8/1966 | Bill | 244—23 |

FOREIGN PATENTS

| | | |
|---|---|---|
| 586,572 | 3/1947 | Great Britain. |
| 951,942 | 4/1949 | France. |

MARTIN P. SCHWADRON, *Primary Examiner.*

MARK NEWMAN, *Examiner.*

D. HART, *Assistant Examiner.*